H. W. LINDSEY, Jr.
SPRING SUSPENSION FOR VEHICLES.
APPLICATION FILED OCT. 9, 1919.
1,390,363.
Patented Sept. 13, 1921.
3 SHEETS—SHEET 2.
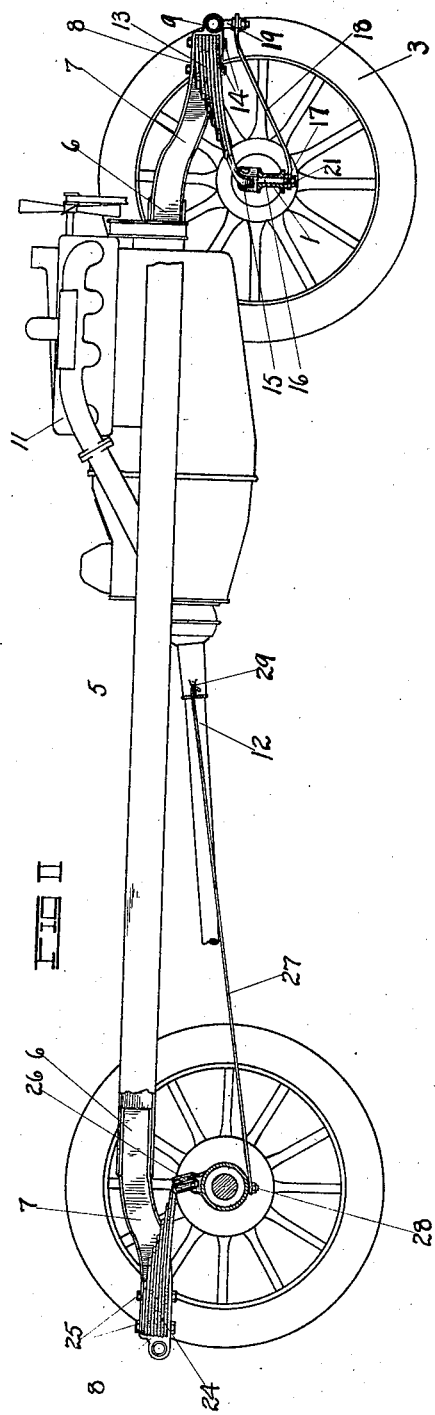
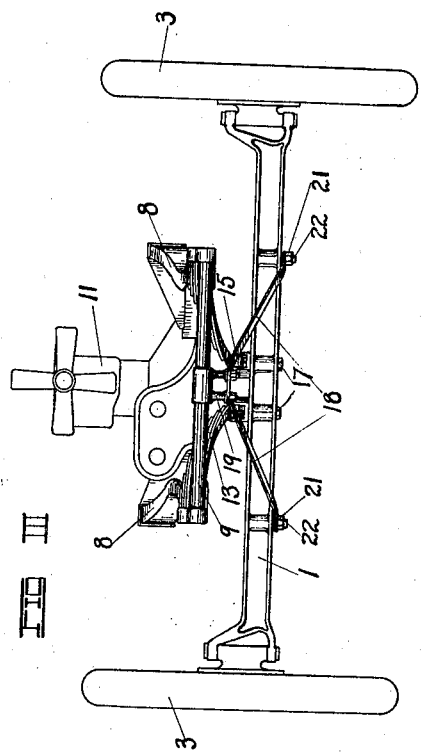
INVENTOR.
Harry W. Lindsey, Jr.
BY Chester W. Braselton
ATTORNEY H. W. LINDSEY, Jr.
SPRING SUSPENSION FOR VEHICLES.
APPLICATION FILED OCT. 9, 1919.
1,390,363.
Patented Sept. 13, 1921.
3 SHEETS—SHEET 3.
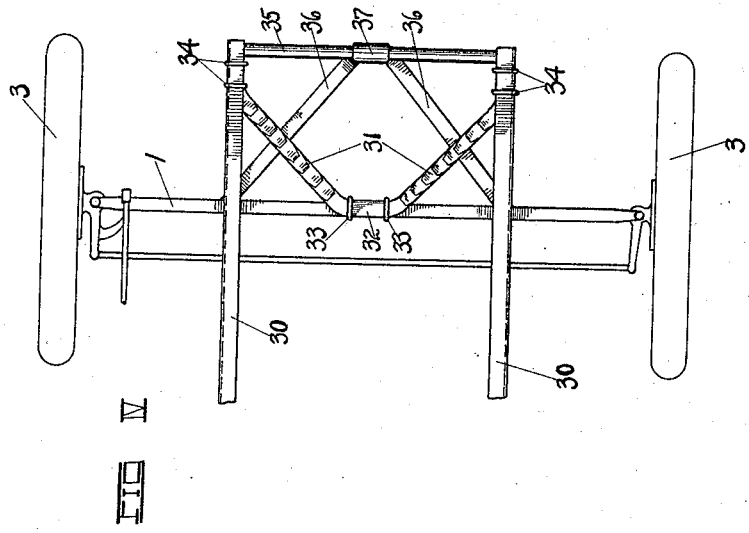
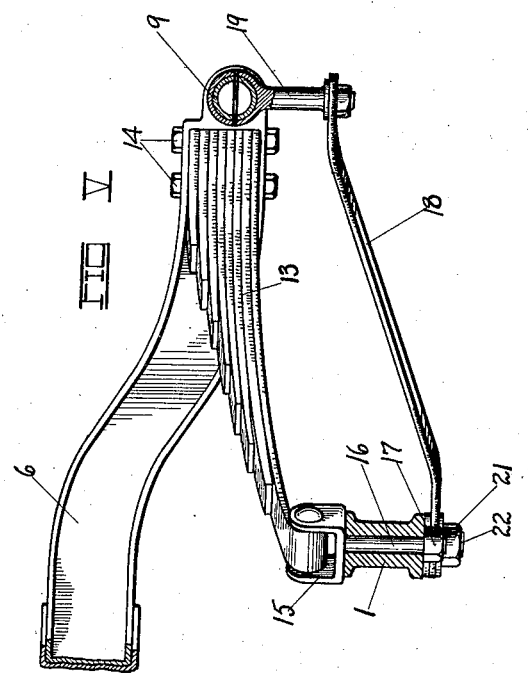
INVENTOR.
Harry W. Lindsey, Jr.
BY Chester W. Braselton
ATTORNEY

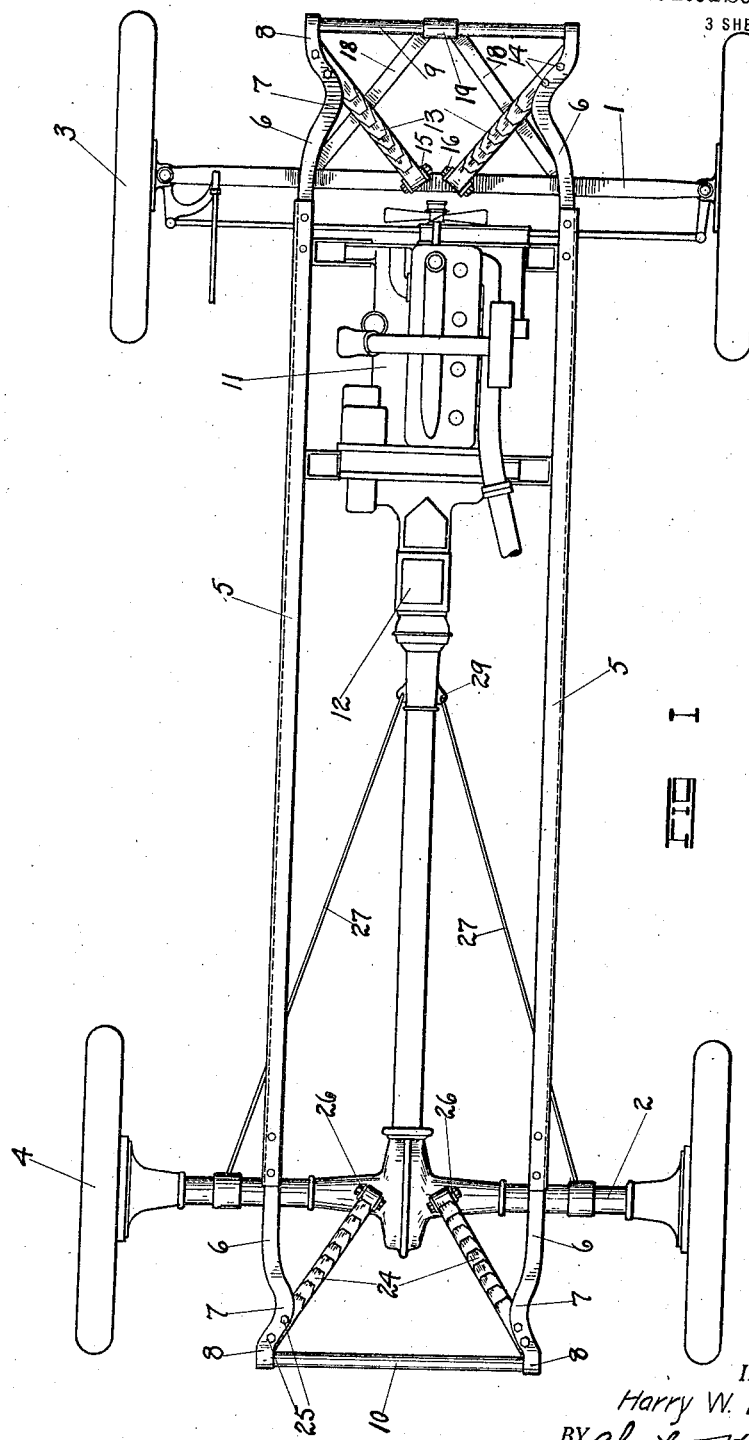

UNITED STATES PATENT OFFICE.

HARRY W. LINDSEY, JR., OF TOLEDO, OHIO, ASSIGNOR TO THE WILLYS-OVERLAND COMPANY, OF TOLEDO, OHIO, A CORPORATION OF OHIO.

SPRING SUSPENSION FOR VEHICLES.

1,390,363.                 Specification of Letters Patent.     Patented Sept. 13, 1921.

Application filed October 9, 1919.  Serial No. 329,419.

*To all whom it may concern:*

Be it known that I, HARRY W. LINDSEY, Jr., residing at Toledo, county of Lucas, State of Ohio, have invented certain new and useful Improvements in Spring Suspensions for Vehicles, of which I declare the following to be a full, clear, and exact description.

This invention relates to an improved spring suspension for vehicles, and especially to a spring suspension wherein the end portions of the vehicle frame are adapted to extend beyond the front and rear axles of the vehicle whereby the vehicle frame is supported in such a manner as to give increased resiliency and flexibility thereto.

One object of the invention is to provide an improved spring device of this character wherein the frame is so supported as to increase the resilient mounting thereof over that obtained by the ordinary form of spring suspension.

A further object of the invention is to provide a device of this character which is of simple construction and efficient in operation.

A further object of the invention is to provide a spring suspension of this character wherein the springs are supported substantially from the central portions of the front and rear axles, thus increasing the flexibility of the frame mounting.

Further objects of the invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention as pointed out in the appended claims. A structure constituting one embodiment of the invention is illustrated in the accompanying drawings forming a part hereof in which:

Figure I is a top plan view of a vehicle frame illustrating the manner of supporting the same from the running gear of the vehicle.

Fig. II is a side elevational view partly in section of the structure illustrated in Fig. I.

Fig. III is a front elevational view of the vehicle frame illustrated in Fig. I.

Fig. IV is a top plan view of a modified form of spring suspension.

Fig. V is a detail sectional view taken substantially along the longitudinal center line of the vehicle structure illustrated in Fig. I.

In the embodiment of the invention illustrated herewith, 1 designates the front axle and 2 the rear axle casing of an automobile of the usual construction. The front axle 1 is supported by the usual ground engaging wheels 3, while in a similar manner the rear axle casing 2 is supported by suitable wheels 4. The vehicle frame comprises a pair of longitudinally extending side frame members 5 to each of which is preferably secured an extension 6 having an inwardly bent portion 7 and an out-turned portion 8 near one end thereof, the purpose of which will be more fully described hereinafter. The extensions 6 at the front and rear ends of the frame are suitably connected together by means of cross braces 9 and 10 respectively. An engine 11 of the usual and ordinary construction is adapted to be supported by the vehicle frame and a transmission housing 12 of the usual form is provided for supporting the transmission shaft in proper position for furnishing power to the rear wheels of the vehicle.

A pair of cantaliver springs 13 are rigidly secured to the out-turned portions 8 of the extension 6 at the forward end portion of the frame by means of bolts or other suitable fastening devices 14, and these springs converge inwardly and downwardly to the front axle 1 to which they are adapted to be secured by means of the usual shackles 15 provided with shackle bolts 16 extending through the front axle and secured in place therein by means of suitable nuts 17. In order to suitably support the front axle in proper position relative to the frame, a pair of divergently extending radius rods 18 are secured to a connection 19 carried by the front cross bar 9, and these radius rods diverge rearwardly and downwardly, being suitably secured to the under surface of the front axle and retained in position relative thereto through nuts 21 carried by downwardly projecting bolts 22.

By means of this construction, the front axle of the vehicle is properly retained in position relative to the vehicle frame, and any rotative movement of the axle relative to the frame is eliminated. A cantaliver spring 24 is rigidly secured to the outturned portion 8 of each rear extension 6 by means of suitable bolts or other fastening devices 25, and each of these cantaliver springs extends forwardly from the rear end portion of the frame to a point adjacent the central portion of the rear axle casing to which they are pivotally secured by means of suitable shackles 26.

In order to suitably brace the rear axle casing and retain the same in proper position relative to the remaining portion of the frame structure, a pair of brace rods 27 are secured to the rear axle casing adjacent the end portions thereof by means of suitable bolts 28, and these brace rods extend forwardly and are secured to the transmission casing 12 at a suitable point as at 29, whereby they serve to brace the rear axle housing and maintain the same in proper position relative to the frame.

In the modified form of the invention illustrated in Fig. IV, the front axle 1 is supported by the usual ground wheels 3 while the frame comprises a pair of longitudinally extending side frame members 30, the extension disclosed in the other modified form being dispensed with, and the side frame members being directly connected to the spring. In this form of the invention, the spring 31 is of the semi-elliptical type and is provided with a central longitudinal portion 32 adapted to be secured to the front axle near the center thereof by means of the usual form of clips 33, while the end portions of the spring are bent forwardly and secured to the end portions of the side frame members by means of clips 34. The side frame members are connected by the cross brace 35, and a pair of radius rods 36 which are connected to the cross brace 35 near the center thereof through a clip 37 diverge rearwardly and are secured to the under surface of the front axle in any suitable manner as after the manner in which the radius rods 18 are secured to the front axle in the other form of the invention. In the form of the invention illustrated in Fig. IV, the supporting spring at the rear end portion of the vehicle is constructed in a manner similar to the one illustrated in connection with the front end of the vehicle and is adapted to be connected to the central portion of the rear axle casing in any suitable or desired manner.

While I have shown and described in considerable detail, a specific embodiment of my invention, it is to be understood that this showing and description is illustrative only and for the purpose of rendering my invention more clear, and that I do not regard the invention as limited to the precise details of construction illustrated or described, except in so far as I have included such limitations within the terms of the following claims, in which it is my intention to claim all novelty inherent in my invention broadly as well as specifically.

What I claim as new and desire to secure by Letters Patent is:—

1. In a spring suspension for vehicles, a vehicle frame extending beyond the front and rear axles of the vehicle, rearwardly and forwardly converging springs secured to the front and rear portions of the frame respectively and connected to the front and rear axles adjacent the central portions thereof.

2. In a spring suspension for vehicles, a vehicle frame extending beyond the front and rear axles of the vehicle, and cantaliver springs connecting each side end portion of the frame with the adjacent axle near the center thereof.

3. In a vehicle, the combination of a frame comprising a pair of side bars, front and rear axles, a pair of cantaliver springs rigidly connected at their rear ends to said front axle adjacent the center thereof diverging forwardly and connected to the front end of the frame, and a second pair of cantaliver springs connected at their forward ends to said rear axle diverging rearwardly, and connected to the rear end of said frame.

4. In a vehicle, the combination of a frame comprising a pair of side bars and brace rods connecting the ends of the side bars, front and rear axles, a pair of cantaliver springs rigidly connected at their front ends to the frame converging rearwardly and connected to the front axles, and a second pair of cantaliver springs rigidly connected at their rear ends to the frame converging forwardly and connected to the rear axles.

5. In a vehicle, the combination of a frame, front and rear axles, a pair of cantaliver springs connected at their forward ends to the frame and converging downwardly and rearwardly to the front axle, a second pair of cantaliver springs connected at their rear ends to the frame and converging forwardly and downwardly to the rear axle.

6. In a vehicle, the combination of a frame, front and rear axles, a pair of cantaliver springs converging rearwardly from the front end of the frame to the front axle, means for rigidly connecting the forward ends of said springs to the front end of the frame, a second pair of cantaliver springs converging forwardly from the rear end of the frame to their connection with the rear axle, and means for rigidly securing the rear ends of said springs to said frame.

7. In a vehicle, the combination of a frame, front and rear axles, a pair of springs each connected at one end to said front axle and diverging forwardly to said frame, means for connecting said springs to said frame, a second pair of springs connected to the rear axle and diverging rearwardly to said frame, and means for connecting said last mentioned springs to said frame.

8. In a vehicle, the combination of a frame and axle, a pair of cantaliver springs rigidly connected at one end to said frame and converging longitudinally from said frame to said axle, and means for connecting the ends of said springs to said axle.

9. In a vehicle, the combination of a frame, a front and a rear axle, and cantaliver springs extending between each of said axles and said frame and connected to the axles adjacent the longitudinal center of the frame, the distance between said axles being less than the distance between the ends of the frame.

10. In a vehicle, the combination of a frame, a front axle, a rear axle, and springs each connected to the frame and to one of the axles adjacent the central portion thereof, the distance between the ends of the springs connected to the frame being greater than the distance between the ends of the springs connected to the axles.

11. In a vehicle, a frame comprising a pair of longitudinal side frame members, inwardly bent extensions secured to the ends of the side frame members, a pair of axles, and cantaliver springs rigidly secured to the inbent portions of the extensions converging inwardly from opposite ends of the frame and attached to the axles.

12. In a vehicle, the combination of a frame, a front axle, a pair of cantaliver springs rigidly secured to the front end of the frame converging rearwardly and connected to the front axle, and a pair of radius rods secured to the front end portion of the frame diverging rearwardly and connected to the front axle.

13. In a vehicle, the combination of a frame, a rear axle housing, a transmission shaft housing, a pair of cantaliver springs rigidly secured to the rear end of the frame, converging forwardly and connected to the rear axle housing, and a pair of brace rods secured to the rear axle housing converging forwardly and connected to the transmission housing.

14. In a vehicle, the combination of a frame, front and rear axles, a transmission housing, a pair of springs rigidly secured to the front and rear portions of the frame and converging rearwardly and forwardly respectively to the front and rear axles, radius rods connecting the front end of the frame with the front axle, and braces secured to the rear axle converging forwardly and connected to the transmission housing.

15. In a vehicle, a frame comprising a pair of longitudinal side frame members and inwardly and outwardly bent extensions secured to the ends of the side frame members and adapted for attachment to vehicle springs.

16. In a vehicle, a frame comprising a pair of longitudinal side frame members, inwardly and outwardly bent extensions formed on the ends of said side frame members, and cantaliver springs rigidly secured and in alinement with the outwardly bent portions and directed inwardly toward each other.

17. In a spring suspension for vehicles, a vehicle frame extending beyond the front and rear axle of the vehicles, cantaliver springs connecting each side end portion of the frame with the adjacent axle near the center thereof, and a pair of radius rods secured to one end of the frame and also having connections with an axle.

18. In a vehicle, the combination of a frame, comprising a pair of side bars, front and rear axles, the said side bars extending beyond the front and rear axles, brace bars connecting the extensions of the side bars, radius rods having connections with the front brace bar and the front axle and springs connecting the extensions of the side bars with the axle.

19. In a spring suspension for vehicles, a vehicle frame extending beyond the front and rear axles of the vehicle, a transmission housing, radius rods connecting the front end of the frame with the front axle, braces secured to the rear axle and connected to the transmission housing and cantaliver springs connecting the ends of the frame with the adjacent axle near the center thereof.

In testimony whereof, I affix my signature.

HARRY W. LINDSEY, Jr.